144-144.R 25

BEST AVAILABLE COPY

O. Redmond,

A1

Spoke Machine.

No 167.

A1 Patented June 23, 1857.

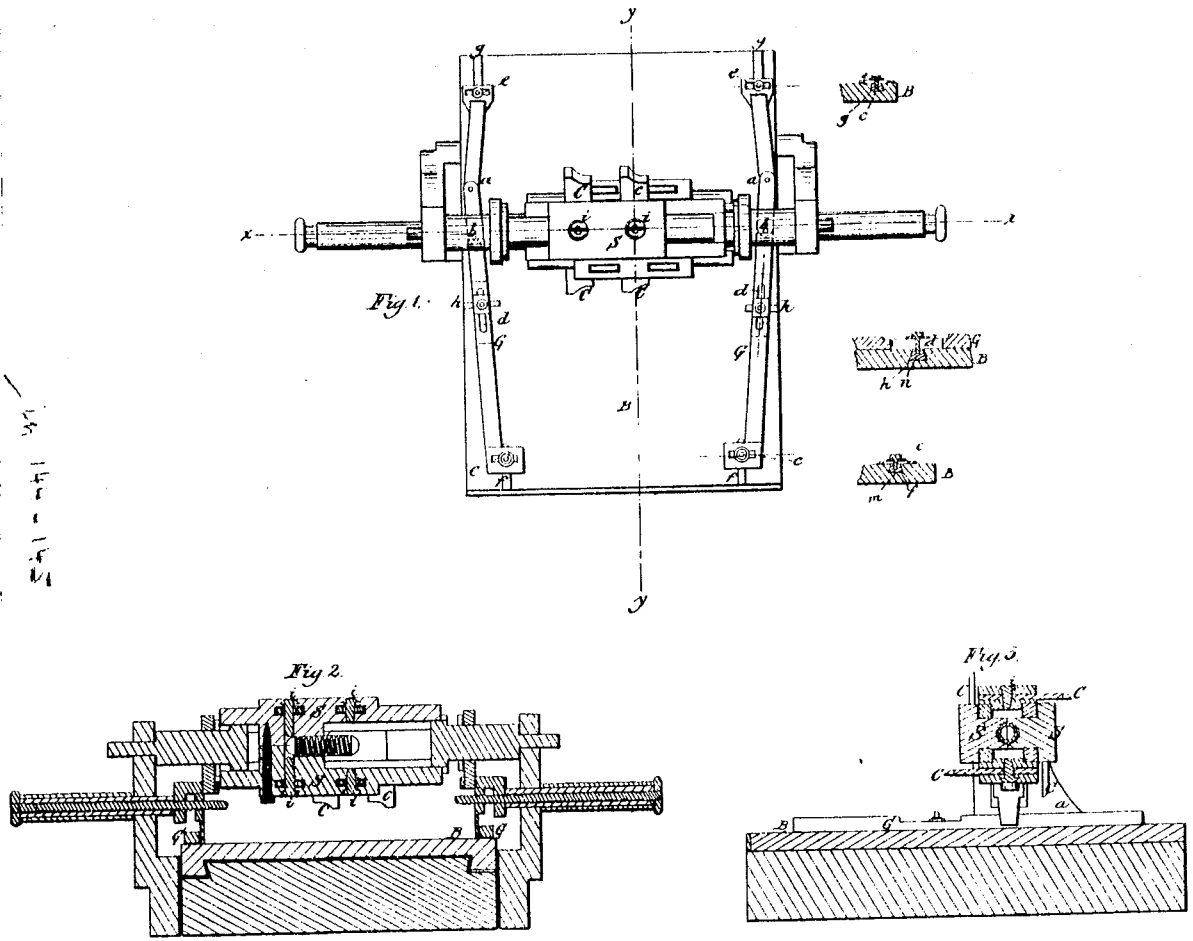

144-145

No. 167, to original Letters Patent No. 13,731.—*For Spoke and Axe-helve Machine.*—I claim the jointed guides having slots *c d e*, in combination with the slots *f g h* of the bed, and bolts securing said guides to the bed; the aforesaid slots having the relative position hereinbefore set forth.

OWEN REDMOND.

A.M. PHOTO-LITHG. CO. N.Y. (OSBORNE'S PROCESS)